S. L. LEBBY.
IGNITION SYSTEM.
APPLICATION FILED FEB. 27, 1911.
1,044,399.
Patented Nov. 12, 1912.
Fig. 1.
Fig. 2.
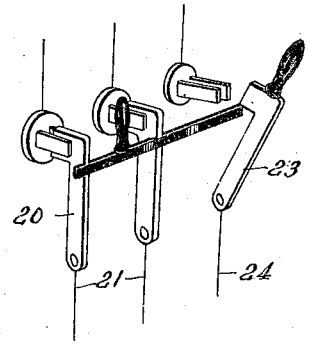
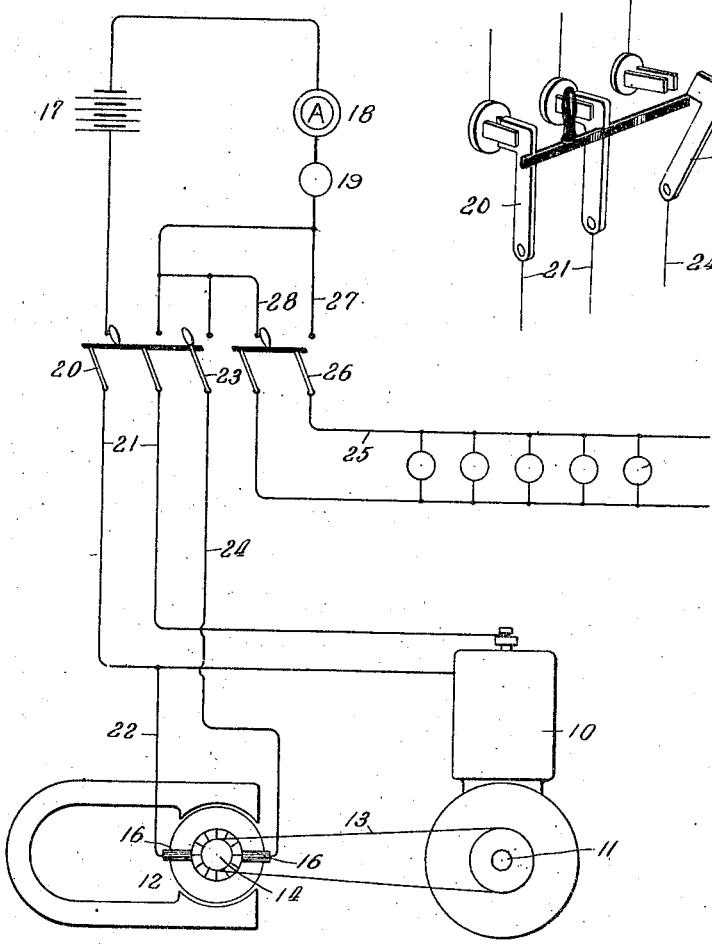
Inventor
States L. Lebby
Witnesses

UNITED STATES PATENT OFFICE.

STATES LEE LEBBY, OF JAMES ISLAND, SOUTH CAROLINA.

IGNITION SYSTEM.

1,044,399.    Specification of Letters Patent.    Patented Nov. 12, 1912.

Application filed February 27, 1911. Serial No. 611,058.

*To all whom it may concern:*

Be it known that I, STATES LEE LEBBY, a citizen of the United States, residing at James Island, in the county of Charleston and State of South Carolina, have invented new and useful Improvements in Ignition Systems, of which the following is a specification.

My invention comprises a system of ignition of gas engines, and for the simultaneous operation of the lights or other power devices upon motor boats and automobiles especially, and also in all situations where it is desired to operate a gas engine at high efficiency, and at the same time be free to operate from the ignition system of the engine lights for use in the vicinity.

The system of my invention comprises in combination a constant field electric generator, geared to a gas engine of variable speed to operate at speeds proportional to the speed of the engine; a storage battery adapted to be floated across the generator; a relatively high resistance armature for said generator having a resistance such that if the battery is thrown across the generator terminals, when the generator is in low voltage condition, the current discharged from the battery through the generator armature will be limited to a value less than the maximum rating of the batteries or less than that of the danger limit for the batteries; and means for connecting the battery, generator, and the sparking devices of the engine together, which means is adapted to prevent connection of the generator to the batteries unless the engine's sparking devices have first been connected to the batteries, and further to insure the disconnection of the generator from the batteries upon the disconnection of the engine's sparking devices from the batteries.

My invention also comprises minor features which will be made clear in my following detailed description.

Figure 1 illustrates diagrammatically the system of my invention. Fig. 2 is a perspective view, detached, of two of the switches used in connection with my invention.

10 designates the engine and 11 the power shaft of the same.

12 is the generator which is connected to the shaft 11 of the engine by means of the gearing 13 of fixed ratio, whereby the armature 14 of the generator is rotated at a speed directly proportional to the speed of the engine 10. This generator is provided with a constant field excitation, the field being constituted by permanent magnets, as shown, the collecting brushes 16, 16 of which are set exactly at right angles to the field flux, and are not given any lag or lead, such as is usual to compensate for field distortion and armature reaction.

17 is the storage battery which is connected through an ammeter 18, and the fuse 19 on one side, and a double pole switch 20 from which extend leads 21 to the sparking devices of the motor. One terminal of the generator is connected through conductor 22 to one of the leads 21 on the near side of the switch 20. The other terminal of the generator is adapted, by a single pole switch 23, to be connected by the cross over connection 24 to the opposite terminal of the battery 17 from that connecting through the switch 20 with the lead 22. Thus one terminal of the dynamo 12 is adapted to be connected to the battery through the engine switch 20, while the other terminal is adapted to be connected from the single pole charging switch 23 to the battery. The switches 20 and 23 are interlocked by means of a lateral projection 29 from the switch 20 underlying the switch 23. Thus the switch 23 will not be closed to connect the dynamo to the battery unless the engine has first been started. Therefore, in starting the engine, it is first necessary to close the engine switch. This effectually prevents the battery from being thrown across the generator prior to the starting of the engine, since the operator meeting with opposition in an attempt to close the switch 23 has before him an unmistakable reminder that the engine switch 20 must first be closed. After the engine is started, the charging switch 23 may readily be closed. Upon the stopping of the engine, the operator must always open the engine's sparking circuit and in so doing, according to the system of my invention, he also manually operates the switch 23, thus disconnecting the generator entirely from the battery. Thus discharge of the battery through the generator by oversight is effectually prevented. If a person entirely ignorant should attempt to start the engine and should close both the engine switch 20 and the charging switch 23 at the same time, high resistance of the armature 14 limits the current to such a value that not only is damage to the battery prevented, but starting of the engine is not interfered with, since the current is kept within such value as does not materially lower voltage of the battery, and upon starting of the engine, the generator comes up to voltage and prevents further discharge of the battery through its armature. Furthermore as a further protection the fuse 19 is made of such size that upon overloading of the battery the fuse will be blown and the battery automatically disconnected.

Lights may be most efficiently operated through this system. The lighting circuit is designated 25, and is connected to the battery circuit through double pole switch 26 connected by lead 27 to the fuse 19 and by lead 28 to the cross over 24 from the other terminal of the battery. The lights operate thus satisfactorily for two broad reasons. First because through the system of connection just described, it is practically impossible to damage the battery and impair voltage regulation, and ampere hour output of the battery. Second through the use of a constant field generator, the generator voltage is made proportional directly to the speed at which it is driven. It is not subject to additional variation due to variation in the strength of the field, as is the case with all self-excited and variable field generators. Again, by reason of the positions in which the brushes are set, as above explained, the voltage of the generator is not subject to disturbances in consequence of variations which might otherwise ensue owing to changes in the angular positions of the brushes, taken in connection with variations in the strength of the field. That is to say, the field magnetism is constant because produced by a permanent magnet, and if the brushes be set in the relation stated there can be no variations set up, due to changes in the strength of the field or to reactions in the armature in consequence of such variations in the field. Moreover, with this arrangement, the field magnetism, being independent of the strength of the current being generated, can never become excessive. This is because the magnetic reactions set up in the armature, and increasing as the speed of the armature increases, tend to cut down or at least to oppose the field magnetism, thus preventing the development of high voltages due to excessive speeds. In other words, the back electromotive force is in this machine more effective than usual in preventing excessive voltages from developing, for the reason that the field magnetism, being constant, does not increase with the increase in the strength of the current as would be the case in most other machines.

While I have described the best form of my invention now known to me, I am aware that my invention may be given other embodiments without departing from its generic spirit. I desire to cover in the annexed claims all such modifications.

I claim—

1. An ignition and lighting system comprising a variable speed gas engine, a generator geared to the engine, a storage battery, sparking devices connected with the engine, an engine switch by which the sparking devices may be connected to the battery to start the engine, a charging switch by which the generator may be connected to the battery, and an inter-lock between the engine switch and the charging switch, whereby the charging switch may not be freely closed until after the engine switch has been closed.

2. An ignition and lighting system comprising a variable speed gas engine, a generator geared to the engine, a storage battery, sparking devices connected with the engine, a manually operable engine switch by which the sparking devices may be connected to the battery to start the engine, a charging switch by which the generator may be connected to the battery, the said charging switch being also manually operable, and a projection from the engine switch into the path of movement of the charging switch whereby the charging switch may not be freely closed until after the engine switch has been closed.

3. In an ignition and lighting system comprising a variable speed gas engine, a generator geared to the engine, a storage battery, the said generator having a relatively high armature resistance, sparking devices connected with the engine, an engine switch by which the sparking devices may be connected to the battery to start the engine, and a charging switch by which the generator may be connected to the battery, and an inter-lock between the engine switch and the charging switch, whereby the charging switch may not be freely closed until after the engine switch has been closed.

4. An ignition and lighting system comprising a variable speed gas engine, a generator geared to the engine, a storage battery, sparking devices connected with the engine, an engine switch by which the sparking devices may be connected to the battery to start the engine, a charging switch by which the generator may be connected to the battery, the said engine switch being a double-pole switch, the said charging switch being a single-pole switch, connections from one terminal of the generator to the engine side of the engine switch, and from the other pole of the generator to the charging switch to the opposite pole of the battery, and an inter-lock between said engine and charging switches, whereby the charging switch may not be freely closed until the engine switch has been closed.

5. The combination, with an internal combustion engine having a sparking device for firing explosive charges therein, of a generator for supplying currents to energize said sparking device, a storage battery, mechanism for connecting said storage battery in circuit with said sparking device, and mechanism, operative only after connection is thus established between said storage battery and said sparking device, for connecting said generator with said storage battery.

6. The combination, with an internal combustion engine having a sparking device for firing explosive charges therein, of a generator for supplying currents to energize said sparking device, a storage battery, an engine switch for connecting said storage battery in circuit with said sparking device, and a charging switch, operative only after connection is thus established between said storage battery and said sparking device, for floating said storage battery in circuit with said generator.

7. The combination, with an internal combustion engine having a sparking device for firing explosive charges therein, of a circuit for supplying currents for general use independently of the firing of said charges, a storage battery for energizing said circuit, a generator for charging said storage battery and also for energizing the sparking device of said engine, means for connecting said storage battery with said sparking device, and mechanism, operative only after connection is thus established between said storage battery and said sparking device, for floating said storage battery in circuit with said generator.

8. The combination, with an internal combustion engine having a sparking device for firing explosive charges therein, of a lamp circuit, a storage battery for energizing said lamp circuit, a generator for charging said storage battery and also for energizing said sparking device of said engine, an engine switch for connecting said storage battery with said sparking device of said engine, and a charging switch, operative only when said engine switch is closed, for connecting said battery to said generator.

In testimony whereof I have hereunto set my hand in presence of two subscribing witnesses.

STATES LEE LEBBY.

Witnesses:
G. M. STUCKER,
C. H. FESLER.